United States Patent
Liu et al.

[11] Patent Number: 6,142,899
[45] Date of Patent: Nov. 7, 2000

[54] ELECTRO-MOTIVE GEAR-SHIFT CONTROL APPARATUS FOR BICYCLES

[75] Inventors: Cheng-Wen Liu; Chih-Wen Chang; Pai-Hsiang Hsu; Ching-Huan Tseng, all of Hsinchu, Taiwan

[73] Assignee: Industrial Technology Research Institute, Hsinchu, Taiwan

[21] Appl. No.: 09/137,875

[22] Filed: Aug. 20, 1998

[30] Foreign Application Priority Data

Feb. 25, 1998 [TW] Taiwan ................................. 87202730

[51] Int. Cl.[7] ........................................................ F16H 9/00
[52] U.S. Cl. ............................................. 474/80; 474/70
[58] Field of Search ......................... 474/80, 78, 69–70, 474/77–82, 110; 280/238, 259, 260, 261

[56] References Cited

U.S. PATENT DOCUMENTS

| | | | |
|---|---|---|---|
| 3,830,521 | 8/1974 | Gardel et al. ........................ | 474/70 X |
| 4,946,425 | 8/1990 | Buhlmann ................................ | 474/80 |
| 5,328,414 | 7/1994 | Restelli ................................... | 474/80 |
| 5,514,041 | 5/1996 | Hsu ..................................... | 474/80 X |
| 5,681,234 | 10/1997 | Ethington ................................ | 474/70 |

*Primary Examiner*—David A. Bucci
*Assistant Examiner*—Marcus Charles
*Attorney, Agent, or Firm*—W. Wayne Liauh

[57] ABSTRACT

An electromotive gear-shift control apparatus for bicycles, which is to be used in a bicycle provided with a gear-shift apparatus; the driving force for such apparatus is furnished with the power of pedals thereof; a motor is used for determining the input of the gear shift; the apparatus comprises a housing, a transmission mechanism, a switch mechanism, and an index mechanism; the housing is a fixed member fastened on the frame of a bicycle; the power source for gear shift is supplied by the driving force of the power shaft between two pedals of bicycle; the switch mechanism is mounted in the housing; the input power form the transmission mechanism is converted, by means of the motor, into a displacement output required by gear shift; the index mechanism is mounted behind the switch mechanism inside the housing, and it is used for converting the vector displacement form the switch mechanism into a step-function output, which is then transmitted, through a cable, into the gear-shift apparatus of the bicycle.

20 Claims, 8 Drawing Sheets

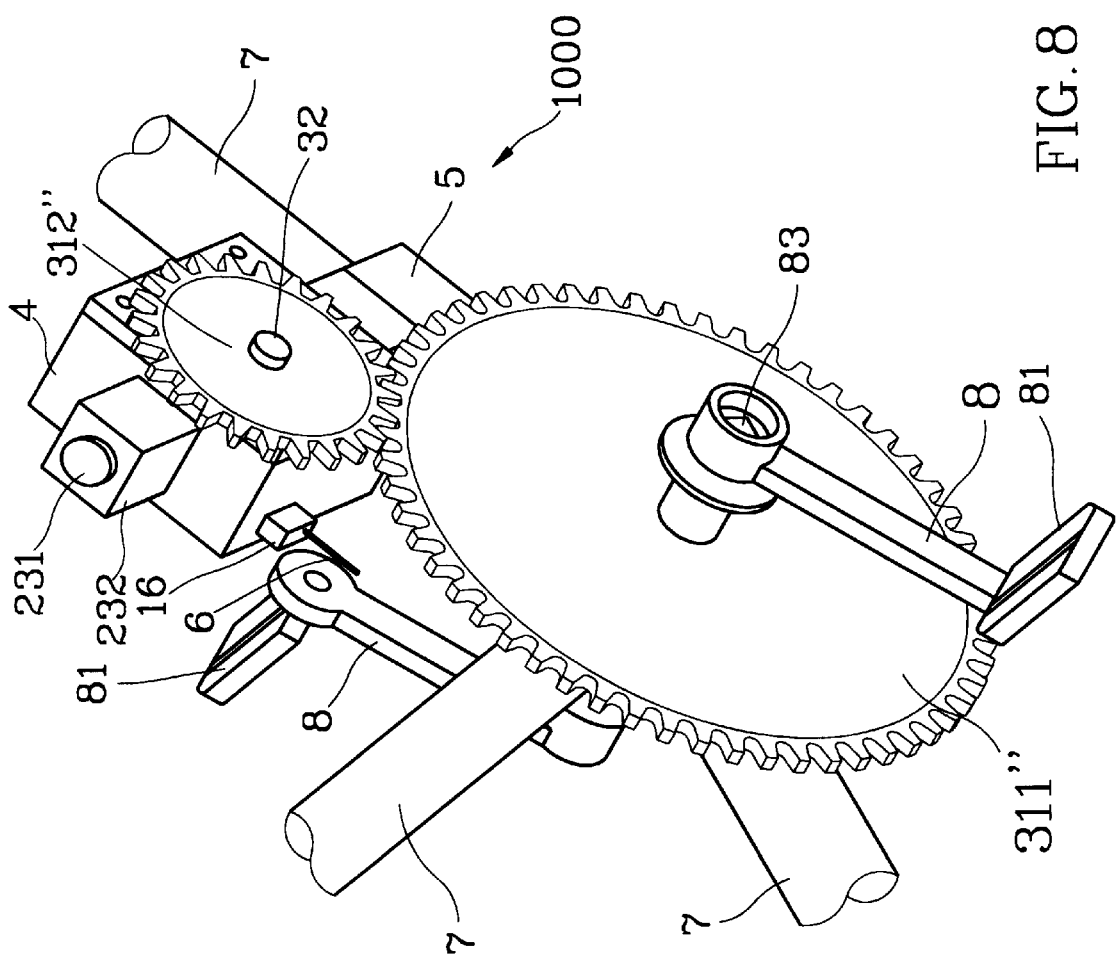

ELECTRO-MOTIVE GEAR-SHIFT CONTROL APPARATUS FOR BICYCLES

BACKGROUND OF THE INVENTION (1) Field of the Invention

This invention relates to an electromotive gear-shift control apparatus for bicycles, and more particularly to an apparatus which uses human pedaling force as the power for gear shifting, and on the other hand uses an electric motor to determine a control displacement for the gear shifting.

(2) Description of the Prior Art

A conventional gear-shifting system of a bicycle is usually an apparatus with only mechanical components. Such an apparatus can generate a displacement signal (i.e., a displacement force) usually by means of a manual control bar on the bicycle handle, which the displacement signal will cause a plurality of co-axial sprockets on the hub to shift in a predetermined order. However, the control of a complete mechanical gear-shifting system is dominated by the human force applied to the control bar, and unfortunately the difficulty in applying a sufficient control force always exist, especially in severe operating surroundings; for example, while in riding a bicycle uphill or in a rush speeding for a race. Apparently, under these conditions, it is difficult to shift a gear with ease. In case of failure to shift a gear in any situations similar to aforesaid, the bicycle might stop immediately as a result of losing driving force, or the rider has to re-operate the control bar. Occasionally, it is quite possible that any mistake during those emergency maneuvering could endanger the rider.

Recently, the emergence of the electromotive gear-shift system for bicycles is specially aimed at improving the drawbacks of the complete mechanical gear-shift system. The electromotive gear-shift system may generally includes three types as follows:

First type (such as disclosed in U.S. Pat. No. 4,946,425 and U.S. Pat. No. 5,328,414) comprises a DC motor, a reducing gear train, and a gear-switch mechanism. The operation of this type is usually to transmit a driving force out of a DC motor to the gear-switch mechanism through the reducing gear train, and then the gear-switch mechanism will complete the gear shifting. The output parts of this type of gear-shifting system are a guide chain and a sprocket, and the function thereof is similar to the conventional transmission apparatus; i.e., the gear shift to be done by means of a sprocket and a chain.

Second type (such as disclosed in U.K. Patent BG 2,295, 868) comprises a DC motor, a reducing gear train, and a gear-switch mechanism for controlling a steel cable of a transmission apparatus. The function achieved by this type is similar to that by the manual transmission bar, except for the DC motor driving a reducing gear train for directly controlling the displacement of the cable to complete the gear shift operation.

The aforesaid first and second types of electromotive gear-shift systems are both utilizing a unique motor to provide the necessary driving force for a gear shift. Therefore, the power consumption in gear shifting is high, and thus a high-capacity power supply is required for the gear shift operation. Since it is impossible to carry an additional battery set on a bicycle, the only way to gain sufficient electricity supply is to strengthen and improve the power-generating capability in the bicycle. Apparently, such a measure would definitely cause the rider to bear more operation loading in generating required electricity.

Third type of the electromotive gear-shift system as shown in FIG. 1 includes a transmission apparatus 430, which is controlled by a transmission control apparatus 500. The gear-shifting driving force of the transmission control is supplied with the pedal driving force 420, which is converted by means of the mechanical displacement control 503 of the transmission control apparatus 500. The gear-shifting difference of the transmission apparatus can be done by means of the transmission selector 400 to be operated by the rider (the transmission selection selector 400 is usually a push-button to replace the conventional control-bar (or shifting lever) as the gear-shifting switch) to input a transmission instruction into the controller 410. Then, the motor 501 regulated by the controller 410 is used for performing the gear-shifting according to the control signal from the controller 410 so as to control the displacement (i.e., the output) of the mechanical displacement control 503. By means of the state monitor 505, the state of the mechanical displacement control 503 is fed back to the controller 410.

The U.S. Pat. No. 5,358,451 is deemed as the third type of electro-motive gear-shift system. The aforesaid gear-shift system, mounted to the rear hub and the chain sprocket, includes two electromagnetic valves or a DC motor, and a transmission mechanism for having the transmission system coupled with the electromotive gear-switch mechanism as a driving force upon gear shifting. The two electromagnetic valves or the DC motor is used for connecting the transmission mechanism and the gear-switch mechanism so as to control the gear engaging or gear disengaging. The characteristics of the switch mechanism in the third type are similar to that in the first type; i.e., by using a sprocket to guide a chain for performing gear shifting.

The third type of electro-motive gear-shift system in the art has no similar drawbacks as mentioned in the aforesaid first and second types, but the mechanism of such system is more complicate, and only suitable for the rear transmission system. Therefore, the application and the cost of the third type is deemed to be not economical.

Consequently, the inventor of the present invention has developed an improvement of the electro-motive gear-shift control apparatus in accordance with the third type of electro-motive gear-shift system so as to obtain a new apparatus having simple structure and broader applicability.

SUMMARY OF THE INVENTION

The primary object of the present invention is to provide an electro-motive gear-shift control apparatus for bicycles, which can directly control the gear shifting of a transmission apparatus in an electro-motive gear-shift system.

Another object of the present invention is to provide an electro-motive gear-shift control apparatus for bicycles to be applied in an electro-motive gear-shift system of a bicycle that has a gear-shift apparatus; the pedal driving force of a bicycle is used as the driving force of gear shifting, and a motor is used for determining and controlling the input of gear shifting; such electro-motive gear-shift apparatus comprises a housing, a transmission mechanism, a switch mechanism and an index mechanism.

The housing is a fixed member to be fixed onto the frame of a bicycle by means of a frame clamp.

The transmission mechanism is used to adopt the driving force of the power shaft between two pedals as a driving force required by the gear shifting of the gear-shift control apparatus. Such driving force is to be transmitted into the switch mechanism by means of a driving gear in the housing. The transmission mechanism also includes a transmission wheel train, a driving gear in the housing as a driving force source of the switch mechanism, and a driving shaft for coupling the transmission wheel train output and the driving gear. The transmission wheel train may be a belt pulley assembly, a sprocket-and-chain assembly, a gear train, or any the like.

The switch mechanism is mounted inside the housing, and the input driving force of the transmission mechanism can be connected, by means of a motor, into a displacement output required for gear shifting. The switch mechanism also includes a motor, a worm bar driven by the motor, an upper and a lower rack, and an upper and a lower spring. The motor, for providing required engagement power to the switch mechanism, is mounted on top of the housing, and can be a DC motor or a stepper motor. The worm bar is mounted vertically inside the housing, with one end thereof extending out of the housing for being driven by the motor. Both ends of the worm bar near the inner wall of the housing further including two flanges (an upper restraint plate and a lower restraint plate) respectively. The upper and lower racks, driven by the driving gear, are located between the upper and lower restraint plates, and both racks don't intersect with the worm bar. The midpoints of the upper and lower racks are pivotally connected with the index mechanism. The inner edges of the upper and lower restraint plates are in contact with the outer edges of the upper and lower racks respectively, for having the upper and lower restraint plates to push the upper and lower racks in determining the engagement with the driving gear. The upper spring and the lower spring are connected with the tail ends of the upper and lower racks, respectively, so as to have the racks connected with the index mechanism. These two springs are both tension springs, of which the function is to have the upper and lower racks returned to their original positions while disengaging from the driving gear.

According to the preferred embodiment, the upper and the lower racks are located symmetrically and engageably to the driving gear with expanding ends at one side and closer ends at another sides, and are pivotally connected with, by virtue of flanges thereof, the index mechanism in both middles.

The index mechanism inside the housing is mounted behind the switch mechanism, and is used for converting the displacement input from the switch mechanism into a step-function displacement output; the displacement output is then transmitted, by virtue of the cable, into the rear gear-shift apparatus of a bicycle. The index mechanism includes a connecting block, an indexed slider, an index slider carrier and an index unit.

The connecting block, connected with the switch mechanism, is substantial a space coupling block for converting the displacement output of the switch mechanism into an input for the index mechanism. The connecting block has an index-coupling part which is connected with the switch mechanism, and a position-coupling part extending from the connecting block to fixedly connect the indexed slider. In the preferred embodiment, the center part of the index-coupling part of the connecting block has a balance spring connected with the housing so as to damp the positioning force required by the index mechanism and the gear-shifting force required by the driving gear.

The indexed slider is substantially an elongate sliding block, of which one end is fixedly connected with the position-coupling part of the connecting block, and while other end thereof is connected with a cable. The top surface of the indexed slider is furnished with a plurality of width-wise index grooves, and the bottom surface of the indexed slider forms a sliding surface. In the preferred embodiment, index grooves are to be used for performing the step-function displacement output of the index mechanism via the cable. The bottom and the edge of each groove are preferred to be a round-curved shape so as to provide a smooth gear shifting.

The index slider carrier, used as a sliding rail for the indexed slider, is fastened in the housing, with one end thereof nearing the cable furnished with a restraint block which extends upwards as a limit of the indexed slider and has a through hole for receiving the cable. The indexed slider can be a deep U-shaped sliding rail, a shallow U-shaped rail, a flange-shaped (riding-on shaped) rail, or any the like. Of course, the bottom surface of the indexed slider should be so designed as to fit and mate with the profile of the index slider carrier.

The index unit, mounted on the top side of the indexed slider and used for limiting the motion of the indexed slider in order to fit the step-function sliding regulated by the index grooves, comprises a guiding block, a signal plate, two state spring plates, two state wirings, an index pin and an reset spring.

The guiding block is substantially a guide member being fixedly mounted in the housing; with the bottom surface thereof close to the top side of the grooves of the indexed slider; and with the center part thereof furnished with a guiding hole perpendicular to the top side of grooves of the indexed slider.

The signal plate is a plate mounted on the top side of the guiding block, and has a punch hole in alignment with the guiding hole.

The state spring plates and the state wirings are mounted on the top surface of the signal plate, where the two state spring plates are overlapped above the punch hole without connection to each other. Each outer ends of these two state spring plates is connected with corresponding state wiring.

The index pin and the reset spring are vertically mounted in the punch hole, where the reset spring is a compression spring and of which the upper end is fastened under the signal plate, with the lower end thereof fastened to the mid-part of the index pin. When the reset spring is at its free length, the lower end of the index pin will extend out of the bottom surface of the guiding block, and will contact against in one of the index grooves. When the lower end of the index pin is forced to move upwards, the upper end thereof will extend out of the punch hole of the signal plate to force the two state spring plates to be in contact with each other, and then the two state wirings will be electrically connected.

Another object of the present invention is to provide an electro-motive gear-shift control apparatus for bicycles to match with various types of transmission apparatus, where the spacing between the cable and the index slider carrier is properly controlled so as to fit in various types of conventional front and rear transmission systems, or various kinds of fly wheels apparatus.

Still another object of the present invention is to provide a low cost electromotive gear-shift control apparatus for bicycles, in which simple worm bar, racks, indexed slider, spring and cable are used for controlling the displacement output of the cable so as to control the transmission apparatus at a lower cost.

In order to let examiner understand the present invention further in detail, a detailed description accompanied with drawings is given in the following.

BRIEF DESCRIPTION OF THE DRAWINGS

FIG. 8 is a perspective view of an embodiment of the present invention in which the transmission wheel train is substantially a gear train containing a gear mounted on the power shaft to mesh with the driving gear.

DETAILED DISCUSSION OF THE PREFERRED EMBODIMENTS

The invention relates to an electro-motive gear-shift control apparatus for bicycle, and it is to be used in type-3 of such electro-motive gear-shift control system; the pedal driving force is used for the gear-shift power; a motor is used for controlling the shift position; it mainly includes a simple mechanical structure, but it can provide broad functions for a plurality of proposes so as to solve the problems of complexity of mechanical structure, of poor adaptability and of high manufacturing cost of a conventional gift-shift control apparatus.

Figure 1:
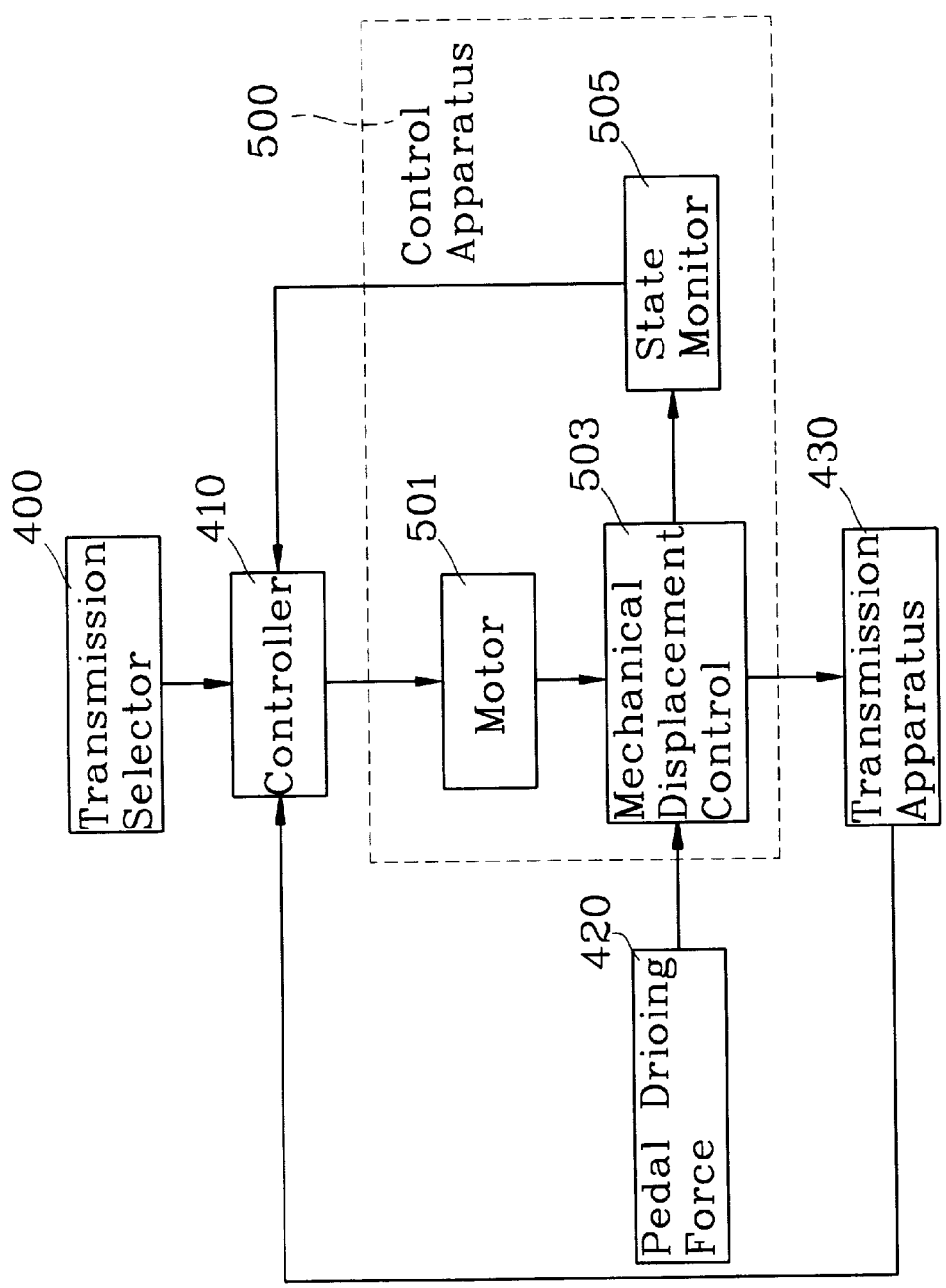
FIG. 1 is a block diagram of a third type of conventional electro-motive gear-shift system for bicycle.
Figure 2:
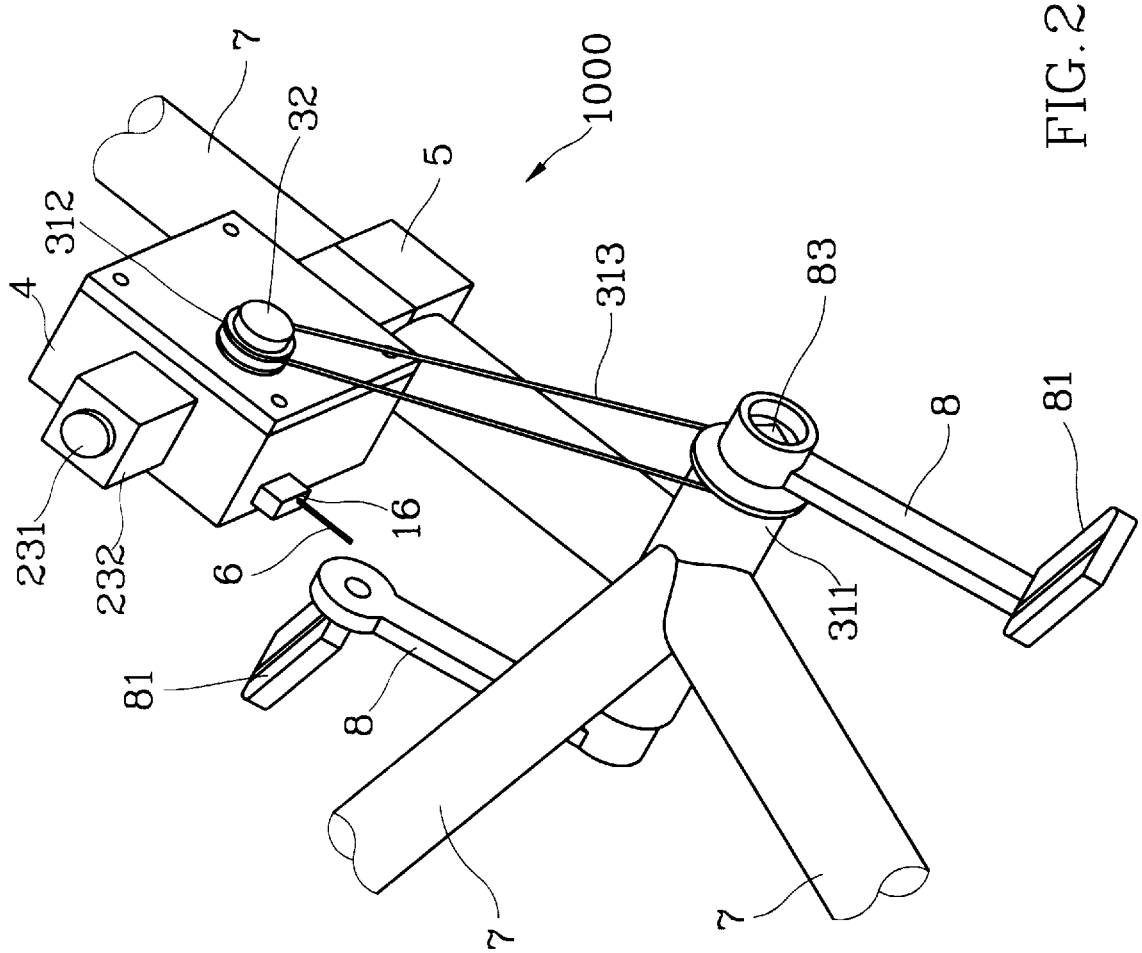
FIG. 2 is a perspective view of a perspective view of a preferred embodiment of an electro-motive gear-shift control apparatus for bicycle according to the present invention.

As shown in FIG. 2, the first preferred embodiment of the present invention shows the structure thereof; the transmission control apparatus 1000 is to be mounted on a suitable of the frame 7 of a bicycle; the suitable part is preferably a part nearing the power shaft 83 of the pedal arm 8 so as to facilitate the driving force of pedal 81 to input.

Figure 3:
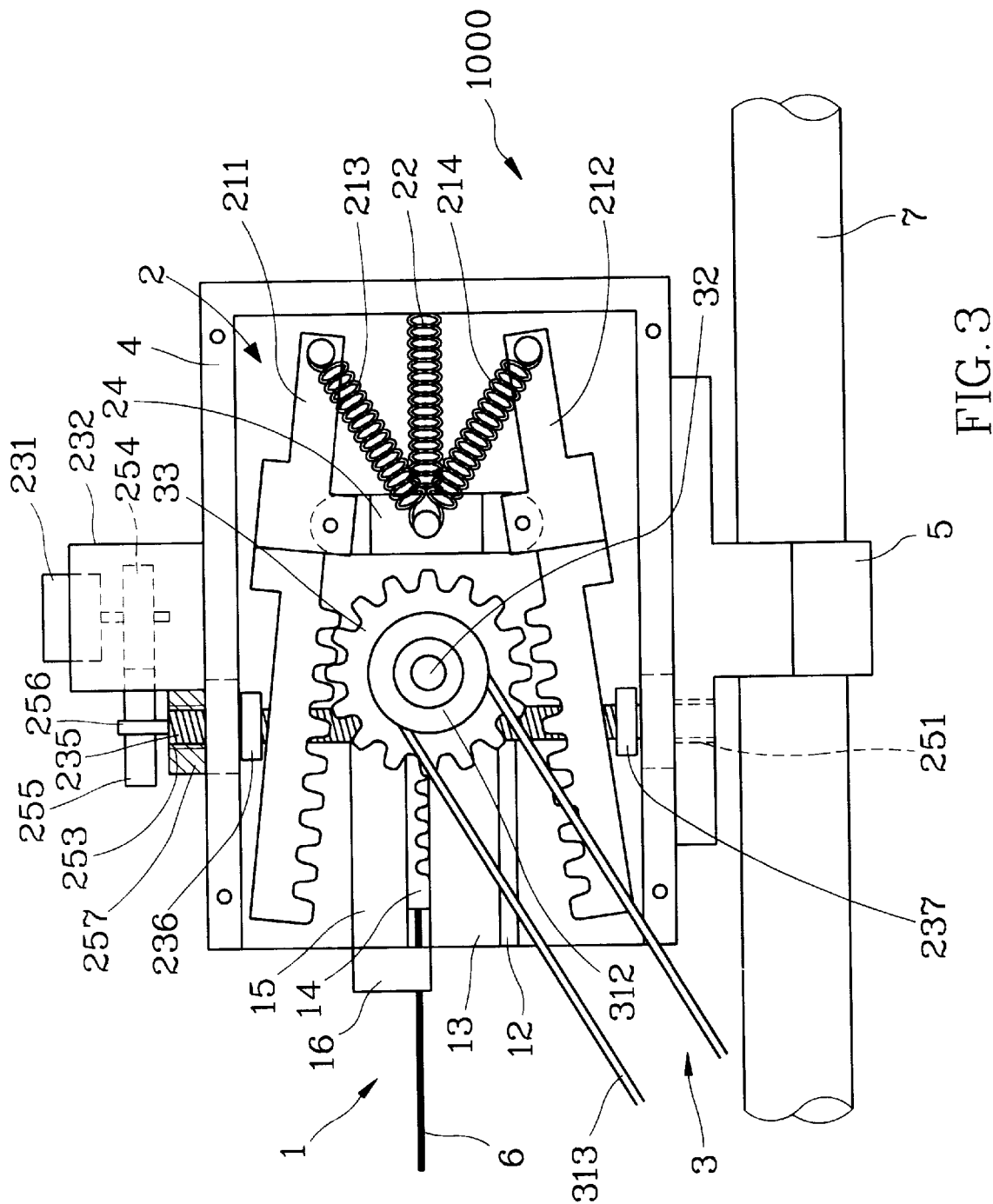
FIG. 3 is a perspective view of the preferred embodiment of an electro-motive gear-shift control apparatus for bicycle according to the present invention, showing the inner structure thereof.

Referring to FIG. 3, which is a side view of the embodiment to show the inner structure of the electro-motive gear-shift control apparatus 1000, which comprises an index mechanism 1, a switch mechanism 2, a transmission mechanism 3 coupled to the pedal driving force, and a housing 4.

The housing 4 is substantially a fixed body portion of the transmission control apparatus, and it is to be fastened to the frame 7 by means of a frame clamp 5 on the outer surface thereof.

Figure 4:
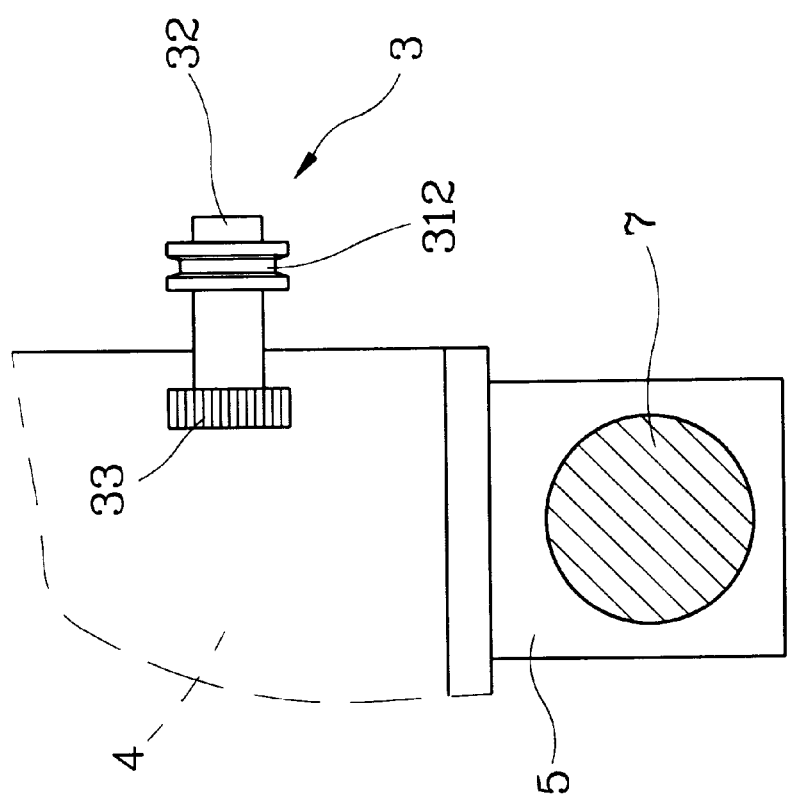
FIG. 4 is a front view of a transmission mechanism in the aforesaid embodiment of the present invention.

The transmission mechanism 3 is input with a driving force by means of the pedal 81 (as shown in FIG. 2) so as to enable gear shift. In the preferred embodiment as shown in FIG. 2 through FIG. 4, the transmission mechanism 3 includes a power pulley 311 mounted on the power shaft 83 between the two pedal arms 8, a transmission pulley 312 mounted on the housing 4, a transmission belt 313 to couple the power pulley 311 and the transmission pulley 312 together, and a driving gear 33 mounted on a driving shaft 32 which penetrates out of the housing 4; the driving gear 33 and the transmission pulley 312 are mounted and rotated on the same shaft 32. During a bicycle is running, the gear-shafting power for the transmission control apparatus 1000 is provided by means of the pedals 81 and the pedal arms 8, which drive the power shaft 83 and the power pulley 311, and then the transmission belt 313 will drive the transmission pulley 312 to actuate the driving shaft 32 and the driving gear 33; the driving gear 33 will rotate in one direction during the bicycle running so as to provide a gear-shift power at any time.

The transmission mechanism 3 is a belt and pulley assembly which as a simple structure is practical use; of course, it may be a sprocket-wheel and chain assembly (i.e., using sprocket wheels to replace the aforesaid power pulley 311, and using a chain to replace the aforesaid transmission belt, and the transmission pulley 312 to be replaced with a sprocket wheel); it may also be a gear train or other means which can provide the same transmission function. Regarding the speed reducing of transmission, the best embodiment is the transmission mechanism 3, which can provide the aforesaid function by varying the outer diameter between the transmission pulley 312 and the power pulley 311; if further speed reducing is required, an additional speed reducing device may be installed between the transmission pulley 312 and the power pulley 311.

Regarding to FIG. 3 again, the switch mechanism 2 can convert the input driving force from the transmission mechanism 3 into a vector displacement output required by the switch mechanism; the switch mechanism 2 shown as a the preferred embodiment in FIG.3 includes a motor 231, a worm bar 235 driven by the motor 231, an upper rack 211, a lower rack 212, an upper spring 213, and a lower spring 214. The motor 231 is used for providing a power to enable the worm bar 235 to rotate, and it is mounted outside the housing 4 by means of a motor casing 232; it may be a D.C. motor or a stepper motor. The transmission between the motor 231 and the worm bar 235 is preferred to an indirect device, i.e., a reducing gear train or the like to be mounted between the motor 231 and the worm bar 235.

The worm bar 235 is mounted through the housing 4; one end of the worm bar 235 extended out of the housing 4 to be coupled with the motor 231; both ends of the worm bar 235 nearing the housing 4 are with two flanges (an upper restraint plate 236 and a lower restraint plate 237) respectively. Nearing the two restraint plates 236 and 237, an upper rack 211 and a lower rack 212 are mounted and don't intersected with the worm bar 235; but the inner sides of the upper restraint plate 236 and the lower restraint plate 237 are in contact with the outer edges of the upper and lower racks 211 and 212 respectively; the driving gear 33 is mounted between the upper and lower racks 211 and 212, being used as a driving means in the transmission mechanism 3.

The upper and lower racks 211 and 212 are mounted at a given angle and an two opposite sides of the driving gear 33; the upper and the lower racks 211 and 212 each have a different angle of pressure; when an action side thereof is set at an angle of pressure under 20 degrees, it will provide a better efficiency; the upper and lower racks 211 and 212 each have a free end; the bigger opening part of the two racks 211 and 212 is engaged with the driving gear 33. The small opening part of the two racks 211 and 212 is pivotally and symmetrically connected with a connecting block 24; by means of such pivotal connection, the upper and lower racks 211 and 212 can be engaged with the upper rack 211 or the lower rack 212 optionally as a result of the motion of the upper restraint plate 236 and the lower restraint plate 237 (to be coupled with the worm bar 235).

According to the preferred embodiment illustrated in FIG. 3, the small opening part of the two racks 211 and 212, two reset springs (an upper spring 213 connected with the upper rack 211 and a lower spring 214 connected with the lower rack 212) are connected with the connecting block 24; and the two springs 212 & 214 are of draw-springs to provide a function of having the upper and lower restraint plates 236 and 237 returned their original positions after the worm bar 235 rotating and pushing them so as to have the upper and lower racks 211 and 212 returned to a position being disengaged from the driving gear 33, and also to have the outer edge of the two racks 211 and 212 touched against the inner sides of the upper and lower restraint plates 236 and 237 respectively.

In another embodiments according to the present invention (not shown in the figures), the driving gear 33 can be replaced by a driving sprocket, a driving gear with asymmetric tooth profile, or the like; and on the other hand, the tooth configuration of the matching upper and lower racks 211 & 212 should be adjusted accordingly for engagement purpose.

As shown in FIG. 3, during gear shifting, the motor 231 will drive the output gear 254 and the input gear 255 to actuate the worm bar 235 to rotate; since the upper end 256 of the worm bar 235 and the input gear 255 are fastened together, the worm bar and the input gear 255 will rotate simultaneously.

The frame clamp 5 and the constraint block 257 on the housing 4 are furnished with screw holes 251 and 253 respectively; the input gear 255 has a larger tooth width, and the input gear 253 can drive the worm bar 235 to rotate and to move downwards or upwards. The upper restraint plate 236 or the lower restraint plate 237 on the worm bar 235 can force the upper rack 211 on the lower rack 212 to engage with the driving gear 33. The turning of the driving gear 33 will drive the upper rack 211 or the lower rack 212, which will drive the index mechanism 1 to move linearly; then, the index mechanism 1 can provide a shift input for gear shifting. In order to have the index mechanism 1 had a correct shifting quantity, the preferred embodiment of the present invention also includes a balance spring 22 connected between the housing 4 and the index mechanism 1; the best mounting position for the balance spring 22 should be on the mid-line between the upper spring 213 and the lower spring 214.

When the switch mechanism 2 is in operation, and when the motor 231 rotates in reverse direction, the worm bar 235 will be driven to move up or down so as to release the upper rack 211 or the lower rack 212 engaged with the driving gear 33. The upper rack 211 or the lower rack 212 can be pulled to its original position by means of the upper spring 213 or the lower spring 214 respectively; in that case, the balance spring 22 is used for reducing the positioning force required in the index mechanism 1 and the gear-shifting force required in the driving gear 33. In another embodiment, the driving method for all aforesaid upper and lower racks 211 and 212 may also be done by using motors mounted outside the two racks 211 and 212. In this embodiment, the upper and lower restraint plates 236 and 237 are un-necessary.

Referring to FIGS. 3 and 4, the driving shaft 32 extends into the housing 4, and the driving gear 33 in the housing 4 is then mounted on the driving shaft 32; the upper and lower sides of the driving gear 33 are mounted with the upper and lower racks 211 and 212 respectively. The rear sides of the two racks 211 and 212 is mounted with the worm bar 235, behind which the index mechanism 1 is indexed inside the housing 4.

Figure 5:
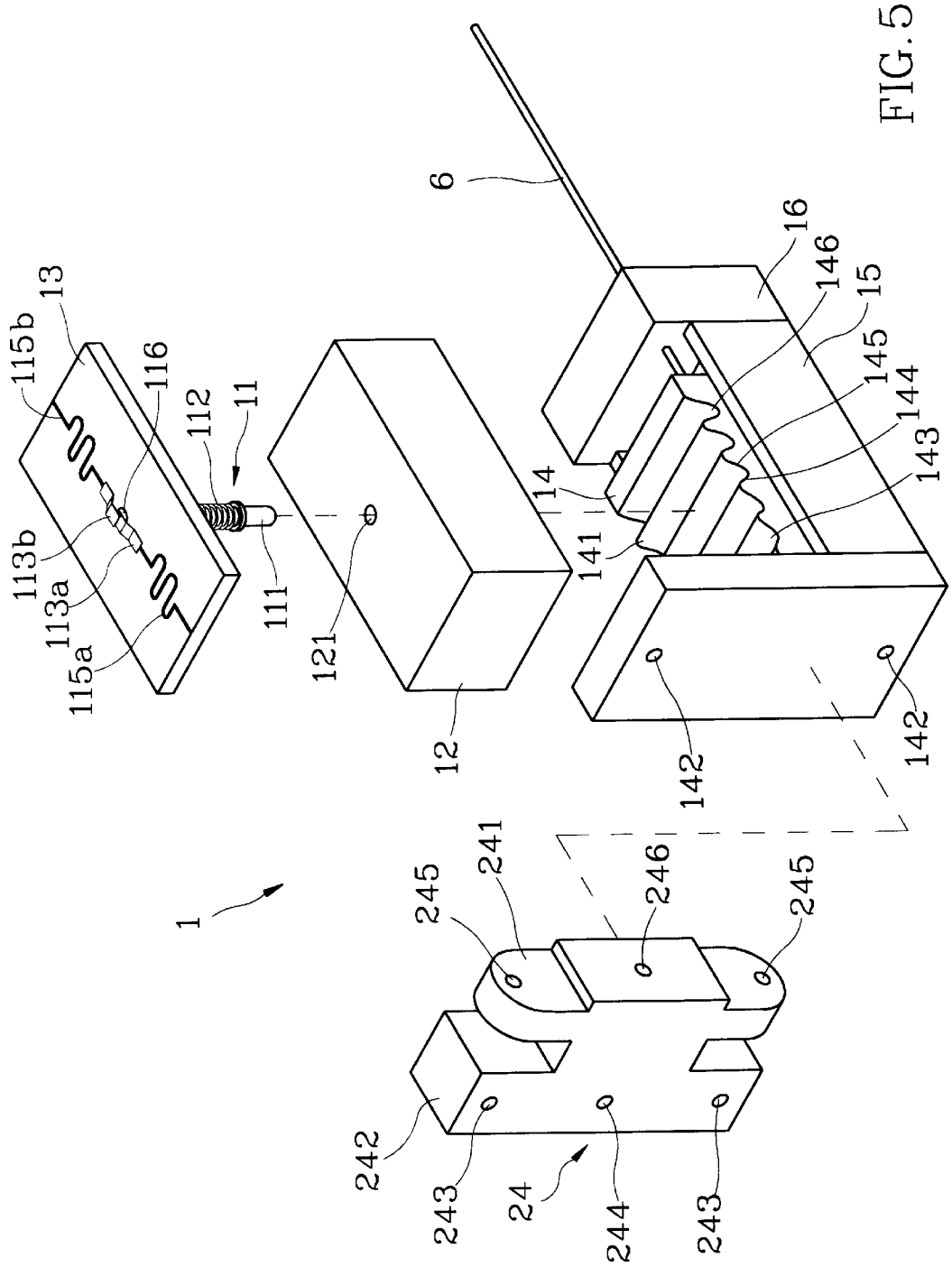
FIG. 5 is a disassembled view of an index mechanism in the aforesaid embodiment of the present invention.

Referring to FIG. 5, it is a perspective and disassembled view of the index mechanism 1 of the preferred embodiment according to the present invention; the index mechanism 1 is used for providing a correct displacement output so as to shift gears directly; the mechanism 1 includes an indexed slider 14, an index slider carrier 15, an index unit 11 and a connecting block 24.

The connecting block 24 is used for converting the displacement out of the switch mechanism 2 into an input quantity of the index mechanism 1, i.e., the block 24 is deemed a space coupling block; in other words, it is used to extend the third connecting holes 245 of the index-coupling part 241; each end of the upper and lower racks 211 and 212 of the switch mechanism 2 will be fastened in the connecting holes 245 by means of screws respectively. Two first connecting holes 243 in another position-coupling part 242 are coupled with the coupling holes 142 of the indexed slider 14 by means of screws respectively. The connecting blocks 24 and the indexed slider 24 and the indexed slider 14 may be cost into one piece. According to the preferred embodiment, the upper and lower racks 211 and 212 of the switch mechanism 2 are pivotally mounted with the index-coupling part 241 respectively. The upper and lower springs 213 and 214 are fastened to the fourth connecting hole 246 of the index-coupling part 241 with one end thereof respectively; one end of the balance spring 22 is connected with the second connecting hole 244 of the position-coupling part 242.

The indexed slider 14 is substantially an elongate sliding block to be mounted is parallel with the upper and lower racks 211 and 212; one end of the indexed slider 14 is fastened together with the position-coupling part 242 of the connecting block 24; the indexed slider 14 and the connecting block 24 may be cost into one piece; the other end of the indexed slider 14 is connected with a cable 6. The top side of the indexed slider 14 is furnished with a plurality of horizontal index grooves 141 having different shape and depth; the front index groove 146 that is nearing the cable 6 has a larger depth; the depth of the rest grooves is reduced gradually toward the other end of the indexed slider 14, i.e., the rear index groove 43 near the other end thereof is the most shallow one; the rear wall 145 of the index groove has a slight slope, while the front wall 144 of the shifting has a steep slope. The bottom surface of the indexed slider 14 is a sliding and smooth surface. The space between every two index grooves 141 is used for controlling the output shift quantity of the index mechanism via the cable 6 to convert into a step-function output. In order to have a smooth gear shifting, it would be better to have a dome-shaped ridge furnished between every two index grooves 141, and the bottom of every index groove 141 is also a round curved groove.

As shown in FIG. 5, the upper racks 211 and the indexed slider 14 move in the same direction upon the cable 6 being in lose condition, while the friction force $F_{index}$ of the index pin 111 moves in the opposite direction, i.e., the relation among the driving force $F_{drive}^{U}$ of the upper rack 211, the friction force $F_{index}$, the pulling fore $F_{cable}$ of the cable 6 and the applied force $F_{b-spring}$ of the balance spring 22 may be expressed with an equation as follows:

$$F_{drive}^{U} \geq F_{index} + F_{b-spring} - F_{cable}$$

As soon as the cable 6 is pulled, the lower racks 212 and the indexed slider 14 will move in other direction, i.e., the friction force of the index pin 111 moves in the opposite direction; in this case, the relation among the action forces may be expressed with an equation as follows:

$$F_{drive}^{L} \geq F_{index} - F_{b-spring} + F_{cable}$$

Therefore, the index groove 141 must be designed in accordance with the equation as follows:

$$|F_{b-spring} - F_{cable}| < F_{index}$$

According to the aforesaid description, it is understood that $MAX(F_{drive}^L) > MAX(F_{drive}^U)$; then the following equation should be considered, i.e., $$MAX\_F_{drive}^L = F_{cable} + F_{index} - F_{b-spring}$$

It is apparent that when the maximum pulling force is applied to the cable 6, i.e., at a high gear, the cable 6 is applied with the maximum pulling force, but $F_{b-spring}$ is minimum, and $|F_{cable} - F_{b-spring}|$ is maximum; then, $F_{index}$ is also the maximum valve; in other words, the depth of the index groove 141 should be the most deep groove upon the cable 6 at a position of the maximum pulling force. Of all the index grooves 141 are set at the same depth at the maximum valve, the friction force $F_{index}$ of every index groove 141 will be the maximum valve, i.e., the average values of $F_{drive}^L = F_{cable} + MAX(F_{index}) - F_{b-spring}$ and $F_{drive}^U = F_{b-spring} + MAX(F_{index}) - F_{cable}$ are all at the maximum values; therefore, when $|F_{cable} - F_{b-spring}|$ is small, the index groove 141 should be a shallow groove. Since the slopes of both sides of the index groove 141 are different, the grooves will become shallower and shower upon $F_{cable} > F_{b-spring}$, and the pulling force $F_{cable}$ of the cable 6 can be reduced. The slope $m_c$ of the index groove near the cable 6 is larger than the slope $m_s$ near the balance spring 22 ($m_c > m_s$); otherwise, $m_c < m_s$; the amount of the two slopes are to be varied with the design of the transmission apparatus and the balance spring 22 because of $F_{cable}$ to be determined in accordance with the design of the gear shift.

The index slider carrier 15 is used as a sliding rail of the indexed slider 14, and it is fixedly mounted in the housing 4; one end of the index slider carrier 15, which nears the cable 6t, is furnished with a restraint block 16, which extends upwards to be used as a limiting means for the position of the indexed slider 14. The restraint block 16 has a through hole for receiving the cable 6. The index slider carrier 15 is a deep L-shaped sliding rail, and it may be a shallow U-shaped rail, a flange-shaped (riding-on-shaped) rail or other shaped sliding rails; of course, the bottom side of the indexed slider 14 to be mounted over the index slider carrier 15 should be so designed as to fit the shape designed of the index slider carrier 15; for example, if the shifting carries 15 is designed into a shallow U-shaped sliding rail, the bottom side of the indexed slider 14 should be a flat and smooth surface. If the index slider carrier 15 is flange-shaped (riding-on-shaped) rail, the bottom side of the indexed slider 14 should be a shallow reverse-L-shaped groove to be mated with the flange-shaped rail. The index slider carrier 15 And the indexed slider 14 may be cast into one piece so as to reduce the dimensions of the gear-shift control apparatus 1000.

The index unit 11 is mounted on the surface of the index grooves 141 of the indexed slider 14, and it is used for limiting the indexed slider 14 to slide in a step-function type of moving. According to the preferred embodiment of the present invention, the index unit 11 includes a guiding block 12, a signal plate 13, an index pin 111, reset spring 112, two state spring plate 113a and 113b, and two state wirings 115a and 115b. The guiding block 12 is substantially a guide member mounted fixedly in the housing 4; the bottom side of the block 12 is in contact with the top surface of the index grooves 141 of the indexed slider 14; the center of the guiding block 12 has a through guiding hole 121 to fall perpendicularly on the surface of the index grooves 141 on the indexed slider 14; the guiding hole 121 is used for receiving the index pin 111 mounted with the reset spring 112. The signal plate 13 is a plate mounted on the guiding block 12, and it has a punch hole 116 in alignment with the guiding hole 121; two state spring plates 113a and 113b overlapped each other but not connected are mounted over the punch hole of the signal plate 13. The outer ends of the two state spring plates 113a and 113b are connected with two state wirings 115a and 115b respectively. The reset spring 112 is a compressed spring, of which the upper end is fastened under the signal plate 13, while the lower end thereof is positioned in the mid-part of the index pin 111; both the spring 112 and the index pin 111 are fitted in the guiding hole 121. The lower end of the index pin 111 is, by means of the pressing force of the reset spring 112, pushed against in one of the index grooves 141 of the indexed slider 14; as soon as the lower end of the index pin 111 is pushed, the upper end of the index pin 111 will penetrate through the punch hole 116 of the signal plate 13 to cause the two state spring plates 113a and 113b to be connected each other; in that case, the two state wirings 115a and 115b become a conduction circuit to send out a signal into a controller so as to determine a suitable time for gear shifting and the motor to rotate reversely.

Figure 6:
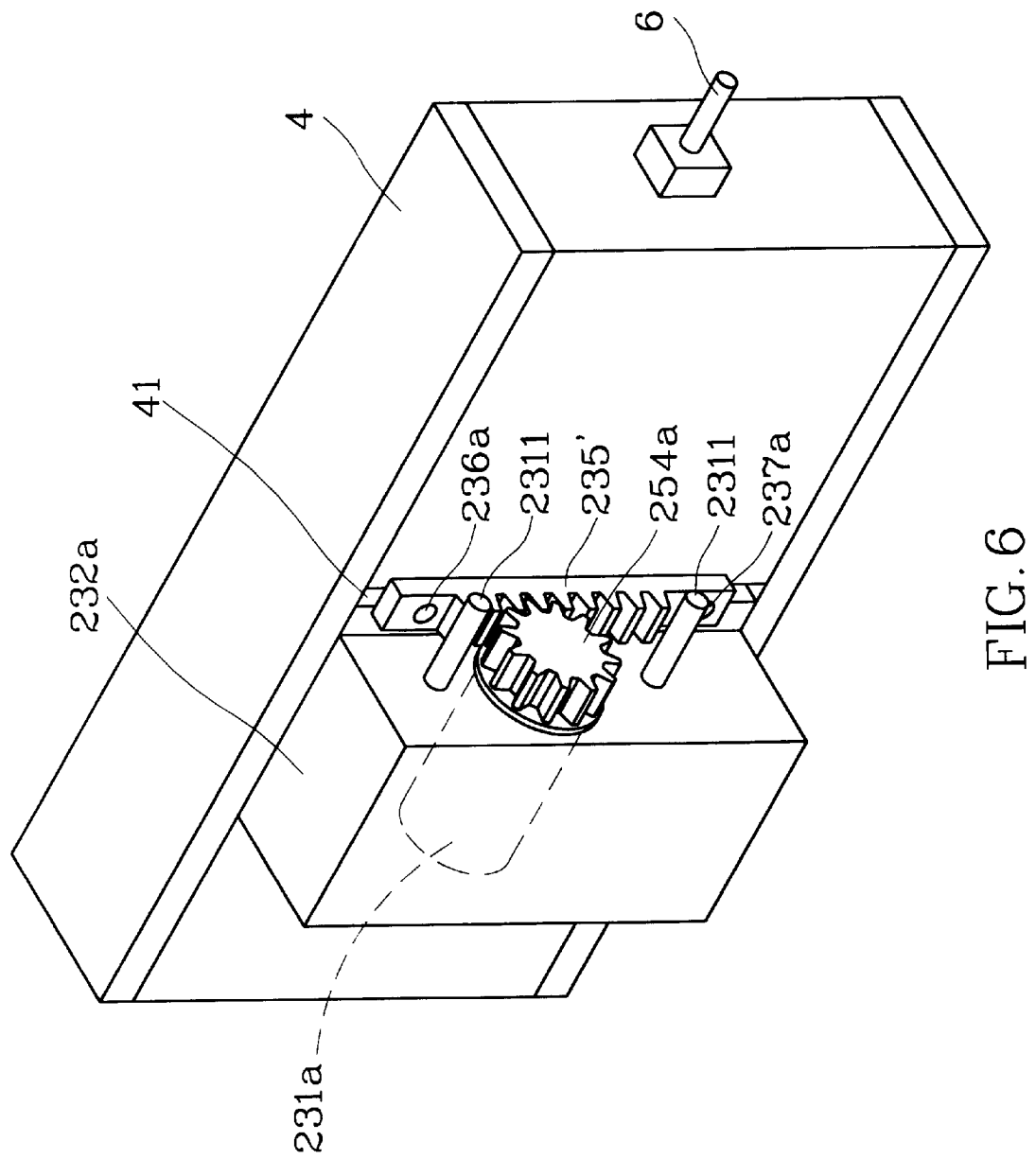
FIG. 6 is a perspective view of another embodiment of the motor device in accordance with the present invention.

Before the index mechanism 1 starts to shift gear, the index pin 111 is pressed against in one of the index grooves 141 to hold the indexed slider 14 in place; as soon as the gear shifting is started, the connecting block 24 will be pushed to move by the switch mechanism 2, and then the indexed slider 14 will be driven to move along the index slider carrier 15. The index pin 111 will, as a result of the motion of the indexed slider 14, move from the existing groove 141 into the next groove 141; during the aforesaid procedures, the index pin 111 is forced to move upwards, and to push the state spring plates 113a and 113b becoming connected each other; then, the two state wirings 115a and 115b are put in conduction state to send out a gear-shifting signal. By means of the reset spring 112, the index pin 111 can slide on the index grooves 141 of the indexed slider 14 accurately and correctly. During gear shifting, the cable 6 of the indexed slider 14 will have a shifting quantity output (a vector, which can be a positive or negative shifting quantity); by means of the shifting quantity output and the cable 6, the shifting sprocket of a conventional bicycle transmission apparatus or other similar device can be controlled. The preferred motor device disclosed in FIG. 3 can be replaced by various driving devices with identical functions. One of these driving device is disclosed in FIG. 6 where another embodiment of the motor device is shown perspective from a rear view contrary to the front view showing in FIG. 3. In this embodiment, a motor 231a, mounted inside a supporting block 232a, is used to drive an output gear 254a. The output gear 254a is then utilized to drive a matching rack 235' in replacement of the worm gear 235. Similar to the preferred embodiment shown in FIG. 3, the matching rack 235' also has the upper restraint plate 236 and the lower restraint plate 237 close to both ends thereof for controlling the engagement between the driving gear 33 and the racks 211 & 212. To facilitate the embodying of the rack 235', a pair of restraint pillars 2311 and a vertical slot 41 on the housing 4 for assuring the motion of the rack 235' along the perpendicular direction to the rotating axle of the output gear 254a can be included as shown in FIG. 6.

Furthermore, in a simplified model of the index mechanism 1 (not shown in figures), the signal plate 13 and the guiding block 12 can be manufactured integrally with the upper portion of the housing 4, and the index slider carrier 15 can also be machined to the lower portion of the housing 4. In such an application, the volume of the whole electro-motive gear-shift control apparatus can be reduced; but, on the other hand, the machining of the housing 4 will be increased to some extend.

In addition, the balance spring 22 can be alternatively constructed to connect the housing 4 with the cable 6 for providing more extension capacity in elongation.

The aforesaid description is a detailed description of the preferred embodiments according to the present invention, and it should not be used as a limit to the present invention; any person, who is familiar with such skill, may make minor modification and adjustment thereto, but such modification or adjustment should be deemed still within the spirit and scope of the present invention.

Figure 7:
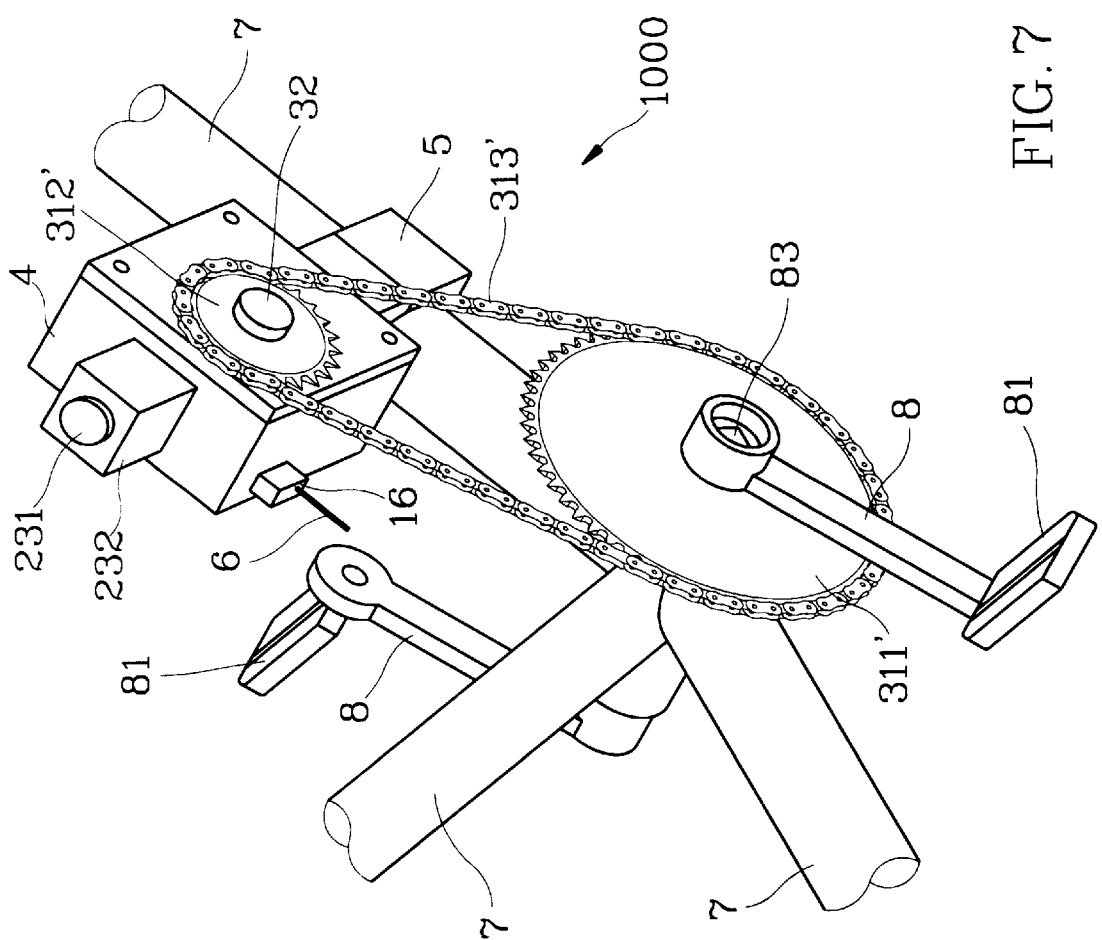
FIG. 7 is a perspective view of an embodiment of the present invention in which the transmission wheel train is substantially a sprocket-and-chain assembly containing a sprocket mounted on the power shaft, an input sprocket mounted outside of the housing, and a transmission chain for coupling the sprocket and the input sprocket.

FIG. 7 is a perspective view of an embodiment of the present invention in which the transmission wheel train is substantially a sprocket-and-chain assembly containing a sprocket mounted on the power shaft 311', an input sprocket 312' mounted outside of the housing, and a transmission chain 313' for coupling the sprocket and the input sprocket.

FIG. 8 is a perspective view of an embodiment of the present invention in which the transmission wheel train is substantially a gear train containing a gear 311" mounted on the power shaft to mesh with the driving gear.

Summing up the aforesaid description, the present invention is deemed concrete to carry out, and conforming to the pre-requisites of a new model application according to the Patent Law; I hope that the Examiner can examine the application fauourahly, and grant a patent thereto.

I claim:

1. An electro-motive gear-shift control apparatus for bicycles, driven by human pedaling force and utilizing a motor for determining an output to control a gear shifting position, comprising:

a housing mounted on a frame of a bicycle;
   a transmission mechanism to be driven with a driving force provided with a power-shaft between two pedals so as to shift gears for said gear-shift control apparatus;
   said driving force to be transmitted to a switch mechanism through a driving gear in said housing;
   said switch mechanism mounted in said housing, and said switch mechanism using a motor to convert an input driving force from said transmission mechanism into a displacement output required by said switch mechanism; and
   an index mechanism connected with said switch mechanism in said housing, and said index mechanism used for converting said displacement output from said switch mechanism into a step-function displacement output which is transmitted via a cable to a gear-shift apparatus of said bicycle.

2. The electro-motive gear-shift control apparatus for bicycles as claimed in claim 1, wherein said transmission mechanism further includes:

a transmission wheel train using a driving force from a power shaft between two pedals of said bicycle, said transmission wheel train including:
      a power pulley mounted on said power shaft of said bicycle to rotate simultaneously with said power shaft;
      a transmission pulley mounted on said housing; and
      a transmission belt used for coupling said power pulley and said transmission pulley;
      a driving gear mounted inside said housing to be used as a driving means of said switch mechanism; and
      a driving shaft penetrated through said housing to be used as a coupling spindle of said transmission pulley outside said housing, and used as a coupling spindle of said driving gear inside said housing.

3. The electro-motive gear-shift control apparatus for bicycles as claimed in claim 2, wherein said transmission wheel train further includes:

a sprocket mounted on and coupled with said power shaft of said bicycle;
   an input sprocket mounted outside said housing; and
   a transmission chain used for coupling said sprocket and said input sprocket.

4. The electro-motive gear-shift control apparatus for bicycles as claimed in claim 2, wherein said transmission wheel train further comprises a gear train which includes a gear mounted on said power shaft to mesh with said driving gear.

5. The electro-motive gear-shift control apparatus for bicycles as claimed in claim 1, wherein said switch mechanism again includes:

a motor to provide said switch mechanism with an engagement power, and said motor mounted outside said housing;
   a worm bar mounted vertically through said housing, and one end thereof extending out of said housing so as to be driven by said motor; both ends of said worm bar further having two flange-shaped plates (i.e., an upper restraint plate and a lower restraint plate) nearing inner walls of said housing respectively;
   an upper rack and a lower rack mounted on outer side of said driving gear; said upper and lower racks being contact-free with said worm bar, but being restrained within said upper and lower restraint plates; after mid-part of each said upper and lower racks connected pivotally on said index mechanism; inner sides of said upper and lower restraint plates able to press on outer edges of said upper and lower racks respectively; and said upper end lower restraint plates able to push said upper and lower racks respectively for alternatively engaging with said driving gear; and
   an upper spring and a lower spring connected with tail ends of said upper and lower racks respectively so as to couple said racks with said index mechanism; said springs being tensile springs to enable outer edges of said upper and lower racks to touch against inner edges of said upper and lower restraint plates respectively and surely.

6. The electro-motive gear-shift control apparatus for bicycles as claimed in claim 5, wherein angles of pressure of said upper and lower racks are different; said angles of pressure being less than 20 degrees so as to obtain better efficiency.

7. The electro-motive gear-shift control apparatus for bicycles as claimed in claim 5, wherein said upper and lower racks are mounted on upper and lower sides of said driving gear, being arranged at a given angle;

each of said upper and lower racks having first and second free ends, said first opening end being larger than said second opening end;
   said first opening end of said upper and lower racks facing said driving gear so as to engage with said driving gear;
   said second opening end of said upper and lower racks being connected pivotally, by means of flange thereof, with said index mechanism respectively.

8. The electro-motive gear-shift control apparatus for bicycles as claimed in claim 5, wherein said worm bar is replaced by gear rack.

9. The electro-motive gear-shift control apparatus for bicycles as claimed in claim 1, wherein further includes a balance spring to connect with said housing and said index mechanism so as to reduce a positioning force required by said index mechanism and a gear-shifting force required by said driving gear.

10. The electro-motive gear-shift control apparatus for bicycles as claimed in claim 1, wherein said index mechanism further includes:

a connecting block connected with said switch mechanism so as to convert a displacement output of said switch mechanism into an input quantity of said index mechanism, said connecting block having an extended position-coupling part to be connected fixedly with an indexed slider;

said indexed slider comprising an elongate sliding block, of which one end connected fixedly with said extended position-coupling part of said connecting block and another end thereof connected with said cable; top side of said indexed slider mounted with a plurality of index grooves, and bottom side of said indexed slider having a sliding surface;

an index slider carrier used as a sliding rail of said indexed slider, and being fastened in said housing; and an index unit mounted on said indexed slider; and said index unit being used for converting motion of said indexed slider into a step-function type of sliding required by said index slider carrier.

11. The electro-motive gear-shift control apparatus for bicycles as claimed in claim 10, wherein said index slider carrier and said housing are cast into one piece so as to save dimensions thereof.

12. The electro-motive gear-shift control apparatus for bicycles as claimed in claim 10, wherein said connecting block comprises an index-coupling part whose center part is mounted with a balance spring connected with said housing;

said balance spring being used for reducing a positioning force required by said index mechanism and a gear-shifting force required by said driving gear.

13. The electro-motive gear-shift control apparatus for bicycles as claimed in claim 10, wherein said indexed slider is furnished with a plurality of index grooves having different depth and shapes, which being used to control said index mechanism to convert a displacement output of said cable into a step-function output.

14. The electro-motive gear-shift control apparatus for bicycles as claimed in claim 13, wherein the two sides of each said index groove have different sloping angles.

15. The electro-motive gear-shift control apparatus for bicycles as claimed in claim 14, wherein bottoms of said index grooves are in round-curved shape so as to provide a smooth gear shifting.

16. The electro-motive gear-shift control apparatus for bicycles as claimed in claim 10, wherein said connecting block and said indexed slider are cast into one piece.

17. The electro-motive gear-shift control apparatus for bicycles as claimed in claim 10, wherein one end of said index slider carrier nearing said cable is connected with a restraint block extending upwards to be used as a limit to said indexed slider, and said restraint block having a through hole for receiving said cable.

18. The electro-motive gear-shift control apparatus for bicycles as claimed in claim 10, wherein said index slider carrier is a flange-shaped (riding-on shape) rail in order to fit said indexed slider, and sliding bottom side of said indexed slider having a shallow reverse L-shape rail so as to have said index slider carrier and said indexed slider mated with each other.

19. The electro-motive gear-shift control apparatus for bicycles as claimed in claim 12, wherein said index unit includes:

a guiding block being substantially a guide member, and being fixedly mounted in said housing, and bottom side of said guiding block being in contact with top side of said index grooves; center of said guiding block having a through guiding hole perpendicular to said top side of said index grooves;

a signal plate being a plate mounted on said guiding block, and having a punch hole in alignment with said through guiding hole;

two state spring plates and two state wirings furnished on top side of said signal plate; said two state spring plates being overlapped each other but not connected, and both outer ends of said two state spring plates being connected with two said state wirings; and an index pin and an reset spring which being mounted vertically in said guiding hole;

said reset spring being a compression spring, of which upper and being fastened to bottom side of said signal plate, while lower end thereof, being fastened at mid-part of said index pin;

wherein lowering end of said index pin extending downwards under bottom surface of said guiding block and touching against one of said index grooves upon said reset spring being stretched freely; as soon as said lower end of said index pin being pushed upwards, upper end of said index pin penetrating through said punch hole to cause said two state spring plate to be in contact with each other and to have said two state wirings become a conducting circuit.

20. The electro-motive gear-shift control apparatus for bicycles as claimed in claim 19, wherein said guiding block, said signal plate, and said housing are cast into one piece.

* * * * *